United States Patent [19]
Stephenson

[11] Patent Number: 5,838,855
[45] Date of Patent: Nov. 17, 1998

[54] SLEEVE HOUSING FOR OPTICAL COUPLING BUILDOUT

[75] Inventor: Daniel Lee Stephenson, Lilburn, Ga.

[73] Assignee: Lucent Technologies Inc., Murray Hill, N.J.

[21] Appl. No.: 857,841

[22] Filed: May 16, 1997

[51] Int. Cl.[6] .................................................. G02B 6/36
[52] U.S. Cl. .............................. 385/53; 385/55; 385/60; 385/56
[58] Field of Search .................................. 385/53, 55, 56, 385/59, 60, 62, 140

[56] References Cited

U.S. PATENT DOCUMENTS

| | | | |
|---|---|---|---|
| 4,892,379 | 1/1990 | Takeda et al. | 350/96.21 |
| 5,067,783 | 11/1991 | Lampert | 385/60 |
| 5,123,071 | 6/1992 | Mulholland et al. | 385/53 |
| 5,274,729 | 12/1993 | King et al. | 385/134 |
| 5,613,025 | 3/1997 | Grois et al. | 385/53 |

*Primary Examiner*—Rodney Bovernick
*Assistant Examiner*—Sung T. Kim

[57] ABSTRACT

The sleeve housing is made of a resilient plastic material, and it has a cylindrical end portion. The cylindrical portion is split, whereby the split portions can be deformed to allow for the insertion of an alignment sleeve containing an attenuating element. The internal portions of the deformable portion of the cylindrical outer portion of the sleeve housing include shoulders which will capture and retain the alignment sleeve when the alignment sleeve has been inserted into the end of the sleeve housing. Consequently, the sleeve housing is able to retain the alignment sleeve without the need for a separate retainer piece. An advantage of the present invention is that a ganged sleeve housing can be made in which there are several connectors which are formed adjacent to one another on a single molded assembly.

14 Claims, 3 Drawing Sheets

SLEEVE HOUSING FOR OPTICAL COUPLING BUILDOUT

BACKGROUND OF THE INVENTION

The present invention relates to optical fiber connectors, or "buildouts". In particular, the present invention relates to an improved sleeve housing for an optical fiber connector.

Modern communications systems use optical fibers to replace wire cables. In order to connect optical fibers together a variety of connectors have been developed. These connectors have taken on a variety of shapes and sizes, but common among them is the need to provide for proper alignment of the optical fibers which are being connected together, and the need to provide for a means for attenuating the signals present on the optical fibers in order that optical signals having different amplitudes can be matched, as needed.

In order to accomplish these, and other desirable results, the optical fiber connectors heretofore known have typically included a component, known as a sleeve, which is generally cylindrical in shape. When the connectors are in use, the optical signal is sent down the length of the sleeve. The sleeve has a slot which extends along its length. An attenuating element, sometimes simply known as an "element" is typically fitted within the sleeve, in the path of the optical signal. An element having an appropriate size, shape, and thickness can be selected, as needed, to attenuate the optical signal as may be desired in a particular signal path.

With reference to U.S. Pat. No. 5,274,729 entitled UNIVERSAL OPTICAL FIBER BUILDOUT SYSTEM, which issued to W. W. King, et als. on Dec. 28, 1993 ("the King '729 patent"), a variety of optical fiber connectors are shown. While the optical fiber connectors of the prior art have generally met the basic needs expressed above, they have experienced a number of problems. In particular, the optical fiber connectors of the prior art have required that in the course of making connections, it has been necessary to rotate one optical fiber connector relative to another. This relative rotation can result in damage to the end face of an optical fiber if it is in contact with another surface at the time of rotation. In order to eliminate such rotation, the present inventor has devised a system for connecting optical fibers which does not require relative rotation of the optical fiber connectors. That system is the subject of a U.S. patent application entitled OPTICAL FIBER COUPLING BUILDOUT SYSTEM, by D. L. Stephenson, et al., Ser. No. 08/857,402 filed May 16, 1997.

Another problem with the optical fiber connectors of the prior art is that the sleeve and attenuator element must be assembled by hand. Then they are placed into a sleeve retainer where they are then held in place by a retainer piece. Due to the small size of the retainer piece, it is quite difficult to perform this assembly, and the assembly process is not readily susceptible to being automated. In addition, the cost of the retainer piece is not insignificant due to the number of optical fiber connector units which are made each year. The sleeve, attenuator, and retainer are illustrated in FIG. 10 of the King '729 patent.

Yet another problem which has existed with the fiber optic connector assemblies of the prior art is that they were necessarily, due to their relative rotational connection described above, single units which could not be either manufactured as a ganged unit or mounted very close to one another.

SUMMARY OF THE INVENTION

In accordance with the present invention, a sleeve housing for an optical connector includes a molded, deformable tubular member having slits and an internal shoulder that can be deformed to allow insertion of an alignment sleeve. This design eliminates the need for a separate retainer, as the internal shoulder design is able to capture the sleeve within the deformable tubular member.

Moreover, unlike the prior art, the sleeve housing connects to an associated buildout block without rotation, thereby allowing multiple sleeve housings to be molded as a single unit.

In particular, the invention is an improved sleeve housing for use in a fiber optic buildout, of the type which includes a tubular member on a buildout block adapted to receive a sleeve holding an attenuator piece. The improvement comprises the tubular member having an outer opening whose diameter is smaller than the outside diameter of the sleeve. The tubular member has an inner diameter adapted to receive and retain the sleeve. The tubular member has at least one slit which extends longitudinally from the outer opening of the tubular member along the outside wall of the tubular member. The tubular member is made of a resilient material. The inside of the outer portion of the tubular member includes an internal shoulder which has an inside diameter which is less than the outside diameter of a sleeve retained within the tubular member. Accordingly, the tubular member can be sprung open to receive the sleeve. The tubular member then springs back to retain the sleeve which cannot slide out of the tubular member due to the smaller outside diameter of the opening at the end of the tubular member. Consequently, the sleeve is retained by the internal shoulder.

In another embodiment of the invention, a ganged sleeve housing for use with fiber optic buildouts is described. The ganged sleeve housing comprises a molded body, and at least two tubular members formed on the molded body. Each of the tubular members is adapted to receive a sleeve holding an attenuator piece. Each of the tubular members has an outer opening whose diameter is smaller than the outside diameter of the sleeve. Each of the tubular members has an inner diameter adapted to receive and retain a sleeve. Each of the tubular members has at least one slit which extends longitudinally from the outer opening of the tubular member along the outside wall of the tubular member. The body and the tubular member are made of a resilient material. The inside of the outer portion of each tubular member includes an internal shoulder which has an inside diameter which is less than the outside diameter of a sleeve retained within the tubular member. Accordingly, each tubular member can be sprung open to receive a sleeve, and each tubular member then springs back to retain the sleeve so that the sleeve cannot slide out of the tubular member due to the smaller outside diameter of the opening at the end of the tubular member. The sleeve is retained by the internal shoulder.

The present invention avoids the need to have two housing units be joined together in order to capture the sleeve (see, e.g., FIG. 3 of U.S. Pat. No. 5,123,071). Accordingly, the fiber optic connectors manufactured in accordance with the present invention will have reduced cost and a reduced number of parts to assemble, relative to the prior art. In addition, assembly of the present invention is susceptible to reduced assembly time and automated assembly processes. In addition, the present invention provides improved connection performance, as it attaches the sleeve housing to the outside connector and provides "float" with the inside connector. Finally, it eliminates the sleeve retainer or C-clip retainer, while providing for enhanced cleaning of the buildout.

DETAILED DESCRIPTION OF AN EXEMPLARY EMBODIMENT

Figure 1:
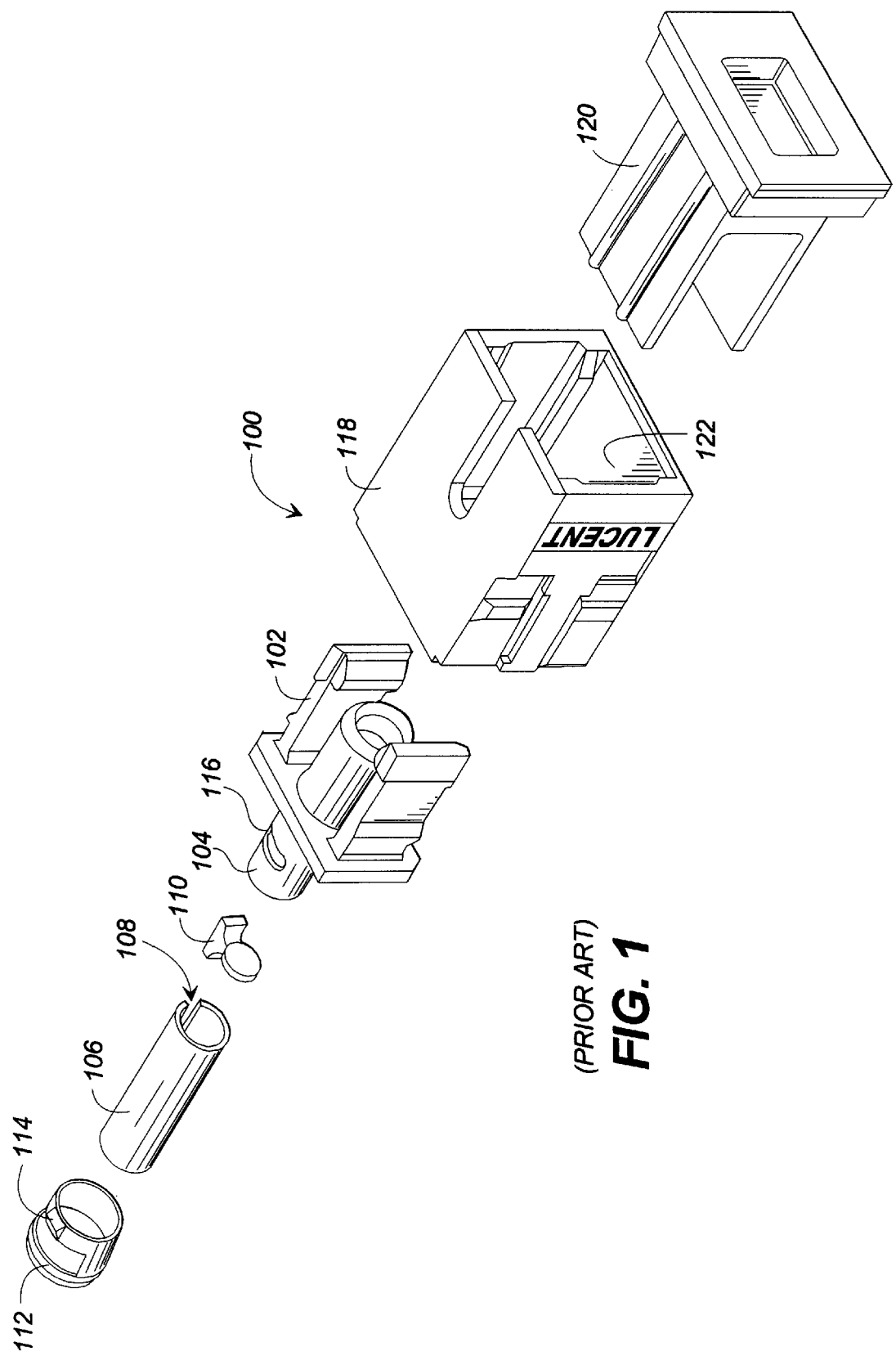
FIG. 1 is an isometric view of a portion of a buildout manufactured in accordance with the prior art which illustrates the problem addressed by the present invention.

Referring first to FIG. 1, a buildout housing 100, manufactured in accordance with the prior art is illustrated. The buildout housing 100 includes a latch 102 which has a cylindrical portion 104 which receives a sleeve 106. The sleeve 106 includes a slot 108 into which an attenuating element 110 is placed. The sleeve 106 and the attenuating element 110 are placed into the cylindrical portion 104, and a retainer 112 is pressed onto the cylindrical portion 104. A raised piece 114 on the retainer 112 snaps into an opening 116 on the cylindrical portion 104, whereby the retainer 112 is secured to the cylindrical portion 104, holding the sleeve 106 and the attenuating element 110 in place. As is obvious to those skilled in the art, the retainer 112 must be carefully placed into the opening 116 in order to insure that the raised piece 114 properly snaps into the opening 116. This requires a step which is not readily automated, and, of course, it requires that there be a retainer 112 piece. The latch 102 is fitted into a housing 118. A dust cover 120 may be used to close off the opening 122 in the housing 118.

Figure 2:
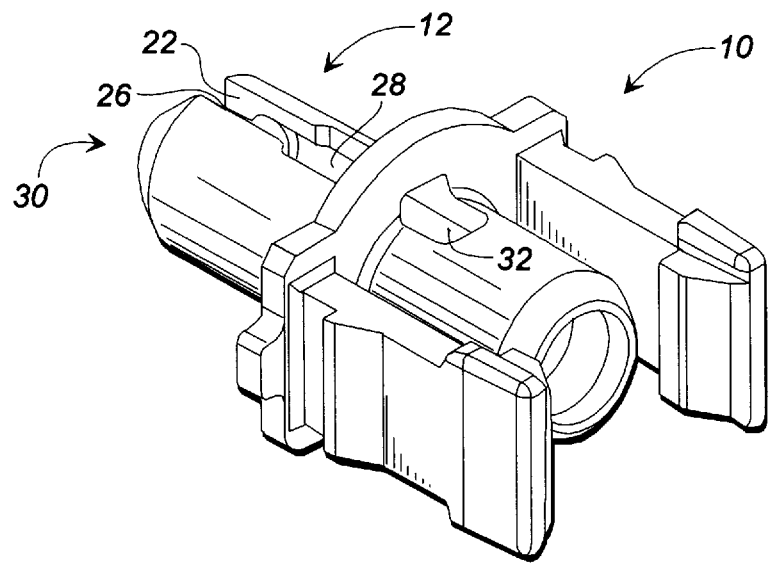
FIG. 2 is an isometric view of the sleeve housing of the present invention.

Referring now to FIG. 2, the sleeve housing 10 of the present invention is shown. The sleeve housing 10 is used to retain the sleeve and attenuating element (within the sleeve) as is well known in the optical connector (or buildout) art.

The novel features of the sleeve housing 10 of the present invention are that it includes a split cylindrical end portion 12 which is designed to receive and retain a sleeve containing an attenuating element, of the type well known in the art, and described and illustrated more fully in FIG. 1 herein, or in the King '729 patent, the contents of which are incorporated herein by reference.

Figure 3:
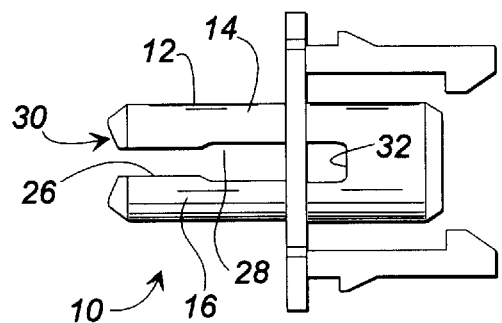
FIG. 3 is a side view of the sleeve housing of FIG. 2, illustrating the side cutouts.
Figure 4:
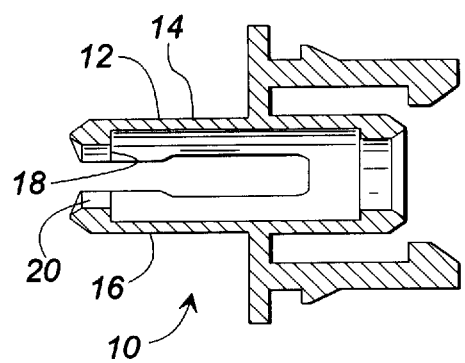
FIG. 4 is a cross-sectional view of the sleeve housing of FIG. 3, illustrating the internal shoulders which are used to retain the sleeve and attenuating element.

With continued reference to FIG. 2, and additional reference to FIGS. 3 and 4, the split cylindrical end portion 12 is shown to include a pair of portions, which are mirror images of one another in the preferred embodiment of the invention, but which need not be in order to carry out the inventive concept described herein. In particular, the portions may be referred to as being an upper portion 14 and a lower portion 16, although the terms "upper" and "lower" are used simply to identify the portions 14, 16 as they appear in FIGS. 3 and 4, and, in reality there is neither an upper, nor a lower portion, per se.

With reference to FIG. 4, the internal portions of the upper and lower portions 14, 16 are shown to include shoulders 18, 20 which will retain, within the housing 10, a sleeve, like the sleeve 106 shown in FIG. 1, which itself retains an attenuating element 108.

In accordance with the present invention, the sleeve housing 10 is a molded tubular member, which is molded from a resilient plastic material. In the preferred embodiment of the invention, the tubular member of the sleeve housing 10 is molded in the form or a cylinder from a resilient plastic, such as polyethermide or polysulfone, which is the preferred plastic. However, those skilled in the art will recognize that other plastic materials can be used without departing from the present inventive concept. Similarly, changing the shape of the "tubular member" from a cylinder to a different shape which is able to retain a sleeve would be within the concept of the present invention. Accordingly, the term "tubular", as used herein is intended to include shapes, including, but not limited to cylinders, which accomplish the purposes set forth herein. For example, a faceted enclosure would be within the scope of the present invention, and it would be a "tubular" member as that term is used herein.

The sleeve housing 10 includes at least one slit 22, and the present invention includes a second slit (identical to slit 22, but hidden from view) on the opposite side of the tubular member. The purpose of the slits 22 is to permit the end opening 30 of the end portion 12 of the sleeve housing 10 to be flexed outward, moving the upper portion 14 away from the lower portion 16, whereby a sleeve can be inserted therein. Once the sleeve containing the attenuator element has been inserted into the sleeve housing 10, while the cylindrical outer portion 26 of the sleeve housing has been deformed to allow such insertion, it will be retained thereafter (i.e., once the deformed portion of the cylindrical end portion 12 has been allowed to flex back to its non-deformed state), and the internal shoulders 18, 20, within the sleeve housing 10 will thereafter prevent the sleeve from falling out of the sleeve housing 10. This design eliminates the need for a retainer (see FIG. 1 or FIGS. 9 and 10 of the King '729 patent). Accordingly, the sleeve housing 10 of the present invention is able to capture the sleeve without the need for a separate retainer piece, of the type used in the prior art.

As illustrated in FIGS. 3 and 4, the slits include a wide portion having a wider opening 28, which provides room for the attenuator element. The end 32 of the wide portion 28 which is remote from the opening 30 is rounded to provide stress relief, and to help prevent the flexing from opening the "jaws" of the tubular member 12 from causing the slit to propogate.

Figure 5:
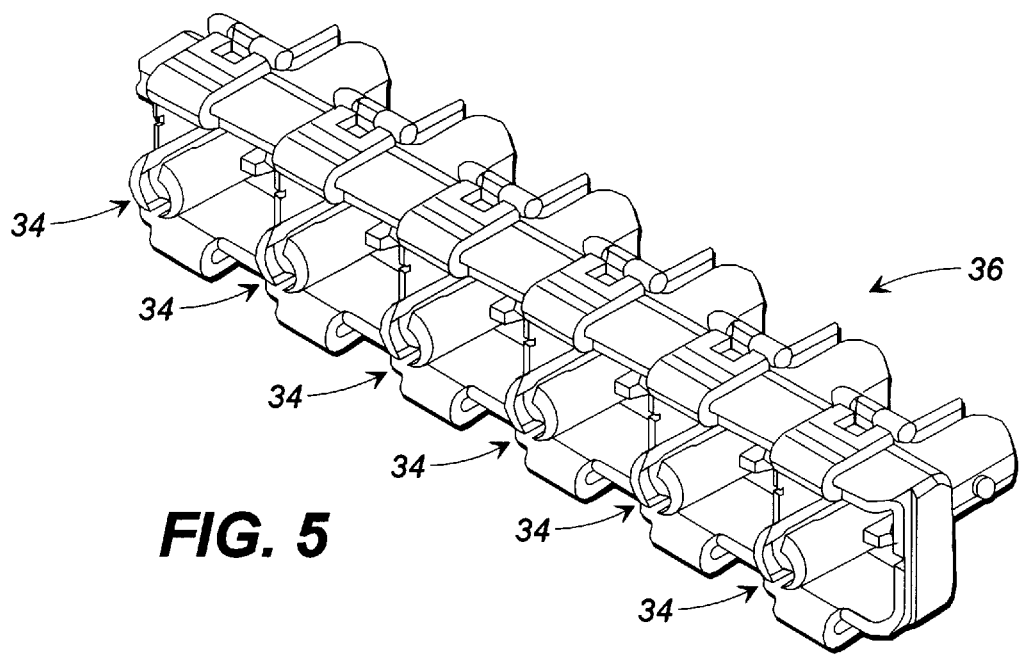
FIG. 5 is an isometric view illustrating how a number of optical fiber connectors using the present invention can be ganged together.

Unlike the prior art, the sleeve housing 10 of the present invention connects to an associated buildout block without rotation, thereby allowing multiple sleeve housings 34 (six shown) to be molded as a single unit. One such ganged arrangement 36 is illustrated in FIG. 5. In the ganged arrangement 36 six sleeve housings are formed in a single mold. One of the reasons why the ganged arrangement 36 can be made is that no rotation is required to attach a connector to the buildout block using the present invention, i.e., there is no interference by an adjacent buildout block when a connection is made, so adjacent connectors can be formed quite close to one another.

As will be obvious to those skilled in the art, the present invention avoids the need for two housing units to be joined together in order to capture the sleeve (as was previously the case). At the same time, the present invention reduces both cost and parts count, while at the same time reducing assembly time.

In addition, the use of the present invention can result in a ganged connector in which there is no rotational assembly of connector elements. Finally, the present invention can promote enhanced cleaning of buildouts in adapter-coupling usage.

I claim:

1. An improved sleeve housing for use in a fiber optic buildout, of the type which includes a tubular member on a buildout block adapted to receive a sleeve holding an attenuator piece, the improvement comprising:

said tubular member having an outer opening whose diameter is smaller than the outside diameter of said sleeve, said tubular member having an inner diameter adapted to receive and retain said sleeve, said tubular member having at least one slit which extends longitudinally from the outer opening of said tubular member along the outside wall of said tubular member, said tubular member being made of a resilient material, the inside of the outer portion of said tubular member including an internal shoulder which has an inside diameter which is less than the outside diameter of a sleeve retained within said tubular member, whereby said tubular member can be sprung open to receive said sleeve, said tubular member then springing back to retain said sleeve whereby said sleeve cannot slide out of said tubular member due to the smaller outside diameter of said opening at the end of said tubular member, said sleeve being retained by said internal shoulder.

2. The sleeve housing of claim 1 wherein said tubular member is molded from a resilient material.

3. The sleeve housing of claim 2 wherein said resilient material is a plastic.

4. The sleeve housing of claim 3 wherein said resilient material is polysulfone.

5. The sleeve housing of claim 3 wherein said resilient material is polyethermide.

6. The sleeve housing of claim 1 wherein there are two slits formed in said outer portion.

7. The sleeve housing of claim 6 wherein there are internal shoulder portions formed within said outer portion.

8. The sleeve housing of claim 7 wherein said resilient material is a plastic.

9. The sleeve housing of claim 8 wherein said resilient material is polysulfone.

10. The sleeve housing of claim 9 wherein said resilient material is polyethermide.

11. A ganged sleeve housing for use with fiber optic buildouts comprising:

(a) a molded body;

(b) at least two tubular members formed on said molded body, each of said tubular members adapted to receive a sleeve holding an attenuator piece, each of said tubular members having an outer opening whose diameter is smaller than the outside diameter of said sleeve, each said tubular member having an inner diameter adapted to receive and retain a sleeve, each said tubular member having at least one slit which extends longitudinally from the outer opening of said tubular member along the outside wall of said tubular member, said body and said tubular members being made of a resilient material, the inside of the outer portion of each said tubular member including an internal shoulder which has an inside diameter which is less than the outside diameter of a sleeve retained within said tubular member, whereby each said tubular member can be sprung open to receive a sleeve, each said tubular member then springing back to retain said sleeve whereby said sleeve cannot slide out of said tubular member due to the smaller outside diameter of said opening at the end of said tubular member, said sleeve being retained by said internal shoulder.

12. The ganged sleeve housing of claim 11, wherein said ganged sleeve housing is molded from a resilient plastic.

13. The ganged sleeve housing of claim 12, wherein said resilient plastic is polysulfone.

14. The ganged sleeve housing of claim 12, wherein said resilient plastic is polyethermide.

* * * * *